(12) United States Patent
Skvoretz

(10) Patent No.: US 9,148,474 B2
(45) Date of Patent: Sep. 29, 2015

(54) REPLACEABLE CONNECTOR

(71) Applicant: Hand Held Products, Inc., Fort Mill, SC (US)

(72) Inventor: Matthew Skvoretz, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/792,322

(22) Filed: Mar. 11, 2013

(65) Prior Publication Data

US 2014/0106594 A1    Apr. 17, 2014

Related U.S. Application Data

(60) Provisional application No. 61/714,415, filed on Oct. 16, 2012.

(51) Int. Cl.
| | |
|---|---|
| H01R 25/00 | (2006.01) |
| H04L 29/08 | (2006.01) |
| H01R 13/621 | (2006.01) |
| H01R 13/74 | (2006.01) |
| G06F 1/16 | (2006.01) |

(52) U.S. Cl.
CPC .............. *H04L 67/10* (2013.01); *H01R 13/621* (2013.01); *H01R 13/74* (2013.01); *G06F 1/1632* (2013.01); *H01R 2201/06* (2013.01)

(58) Field of Classification Search
CPC ........................................................ H01R 31/06
USPC ................................................. 439/638, 915
See application file for complete search history.

(56) References Cited

U.S. PATENT DOCUMENTS

| | | | | |
|---|---|---|---|---|
| 2,613,245 | A * | 10/1952 | Brouillette | 439/323 |
| 4,523,296 | A * | 6/1985 | Healy, Jr. | 439/651 |
| 4,558,570 | A * | 12/1985 | Shtrikman et al. | 62/6 |
| 5,501,608 | A * | 3/1996 | Scheer et al. | 439/218 |
| 5,613,863 | A * | 3/1997 | Klaus et al. | 439/131 |
| 6,256,881 | B1 * | 7/2001 | Starkey | 29/858 |
| 6,760,600 | B2 * | 7/2004 | Nickum | 455/557 |
| 7,238,062 | B2 * | 7/2007 | Sun et al. | 439/701 |
| 7,513,038 | B2 * | 4/2009 | Koh | 29/854 |
| 7,677,929 | B2 * | 3/2010 | Bradford-Stagg | 439/638 |
| 2013/0330950 | A1 * | 12/2013 | Morello et al. | 439/271 |

* cited by examiner

*Primary Examiner* — Phuong Dinh
(74) *Attorney, Agent, or Firm* — Additon, Higgins & Pendleton, P.A.

(57) ABSTRACT

A connector includes a connector body, two or more connector pads within the connector body, and a releasable attachment mechanism for attaching the connector to a mobile computer. The connector may include a seal positioned around the outer edge of the connector body. The connector typically includes two or more connector pins each in contact with a respective connector pad.

18 Claims, 3 Drawing Sheets

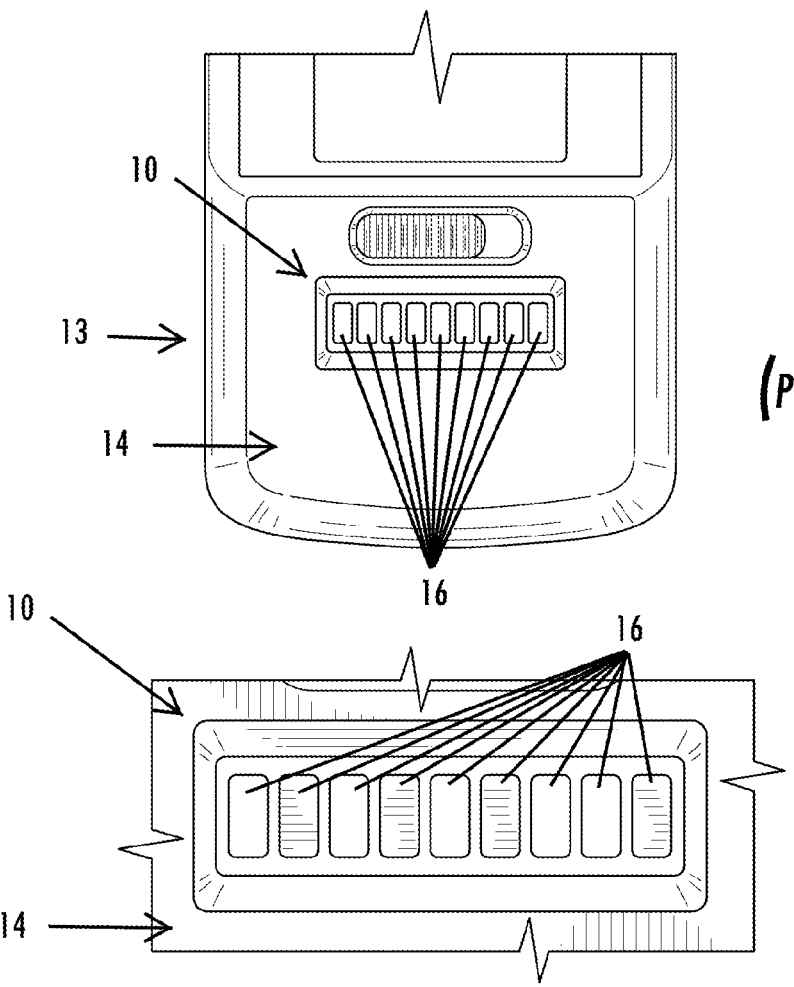
FIG. 1 (PRIOR ART)
FIG. 2A (PRIOR ART)
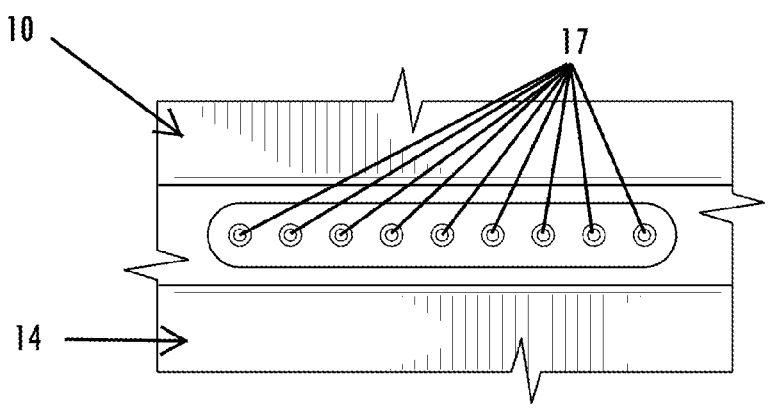
FIG. 2B (PRIOR ART)

REPLACEABLE CONNECTOR

CROSS-REFERENCE TO PRIORITY APPLICATION

This application hereby claims the benefit of U.S. Provisional Patent Application No. 61/714,415 for a "Replaceable Connector" (filed Oct. 16, 2012 at the United States Patent and Trademark Office), which is hereby incorporated by reference in its entirety.

FIELD OF THE INVENTION

The present invention relates to the field of connectors, more specifically, to a connector for a mobile computer.

BACKGROUND

Mobile computers typically include an I/O connector or docking connector to facilitate the transmission of data stored within the mobile computer to a standard computer (e.g., a PC or laptop computer). The I/O connector is typically ultrasonically welded or glued to the housing of the mobile computer.

The connector includes contacts (e.g., connector pads) that correspond to a matching set of contacts housed within a docking station. In operation, the mobile computer is placed in the docking station to establish a connection via the connector's contacts and the docking station's contacts.

Users regularly dock and undock their mobile computers. The process of docking and undocking the mobile computer, typically referred to as a docking cycle, deteriorates the connector's contacts over time. After many docking cycles, the wear on the connector's contacts can degrade the connection between the mobile computer and the docking station. Furthermore, extreme conditions or misuse of the mobile computer can accelerate the degradation of the connector's contacts.

To slow or inhibit the degradation of the contacts over time and increase the number of docking cycles during the life span of the product, more complicated connector designs have been developed. These designs, however, are typically more complicated and more expensive to manufacture. For example, some devices include a connector that is built into the battery door. For these designs, however, replacement of the connector requires replacement of the entire battery door.

In very dirty environments, a connector that performs a wiping action is desirable. To this end, some connector designs mate with a docking station in a sliding action (i.e., a relative motion that contains a horizontal component, rather than a primarily vertical motion) that wipes dirt away from the contacts. Such designs, however, increase the amount of wear on the contacts thereby reducing the life span of the product.

As the connector becomes degraded, the connector is typically cleaned to remove dirt or other contaminants. If the connector cannot be satisfactorily cleaned (e.g., because of misuse or corrosion), the mobile computer is typically removed from operation to be repaired. Repairing the connector of a mobile computer typically requires disassembling the mobile computer's housing and replacing some portion of the connector (e.g., the contacts and/or pins). Such a repair process is typically performed by the manufacturer of the mobile computer, rather than the user of the mobile computer. Thus, the period out of operation required for repair is typically somewhat lengthy and can lead to significant productivity losses.

Therefore, a need exists for a connector and/or housing that facilitates quick restoration of a mobile computer to working order in the field of operation.

SUMMARY

Accordingly, in one aspect, the present invention embraces a connector for a mobile computer that includes a connector body, connector pads within the connector body, and a releasable attachment mechanism for attaching the connector to a mobile computer.

In an exemplary embodiment, the connector's releasable attachment mechanism includes one or more screws.

In another exemplary embodiment, the connector's releasable attachment mechanism includes a mechanical latch.

In yet another exemplary embodiment, the connector includes a seal positioned around the outer edge of the connector body.

In yet another exemplary embodiment, the connector includes two or more connector pins, each connector pin being in contact with a respective connector pad.

In yet another exemplary embodiment, each connector pad includes an external surface that engages a docking station.

In another aspect, the present invention embraces a connector system including a connector and a backhousing. The connector typically includes a connector body, two or more connector pads within the connector body, and an attachment mechanism. The backhousing typically includes a backhousing body and a receiving mechanism for receiving the connector's attachment mechanism. The connector's attachment mechanism and the backhousing's receiving mechanism are adapted to releasably attach the connector to the backhousing.

In an exemplary embodiment, the connector's attachment mechanism includes one or more screws.

In another exemplary embodiment, the connector's attachment mechanism includes a mechanical latch.

In yet another exemplary embodiment, the connector's attachment mechanism includes one or more screws and the backhousing's receiving mechanism includes screw bosses.

In yet another exemplary embodiment, the connector's attachment mechanism includes a mechanical latch and the backhousing's receiving mechanism includes a latch indention.

In yet another exemplary embodiment, the backhousing includes an opening for receiving the connector body.

In yet another exemplary embodiment, the connector includes a seal positioned around the outer edge of the connector body.

In yet another exemplary embodiment, the backhousing includes a seal that is positioned on the backhousing body to prevent the ingress of contaminants between the connector and backhousing when the connector and backhousing are attached.

In yet another exemplary embodiment, the connector system includes a seal to prevent the ingress of contaminants between the connector and backhousing when the connector and backhousing are attached.

In yet another exemplary embodiment, the connector includes two or more connector pins, each connector pin being in contact with a respective connector pad.

In yet another exemplary embodiment, the backhousing includes two or more metal pads, each metal pad positioned to engage a respective connector pad.

In yet another exemplary embodiment, the connector includes two or more connector pins, each connector pin being in contact with a respective connector pad, and the backhousing includes two or more metal pads, each metal pad positioned to engage a respective connector pin.

In yet another exemplary embodiment, each connector pad includes an external surface that engages a docking station.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1 depicts a connector in the bottom housing of a mobile computer.

FIG. 2A depicts a close up view of the external side of a connector in the bottom housing of a mobile computer.

FIG. 2B depicts a close up view of the internal side of a connector in the bottom housing of a mobile computer.

DESCRIPTION

Figure 3:
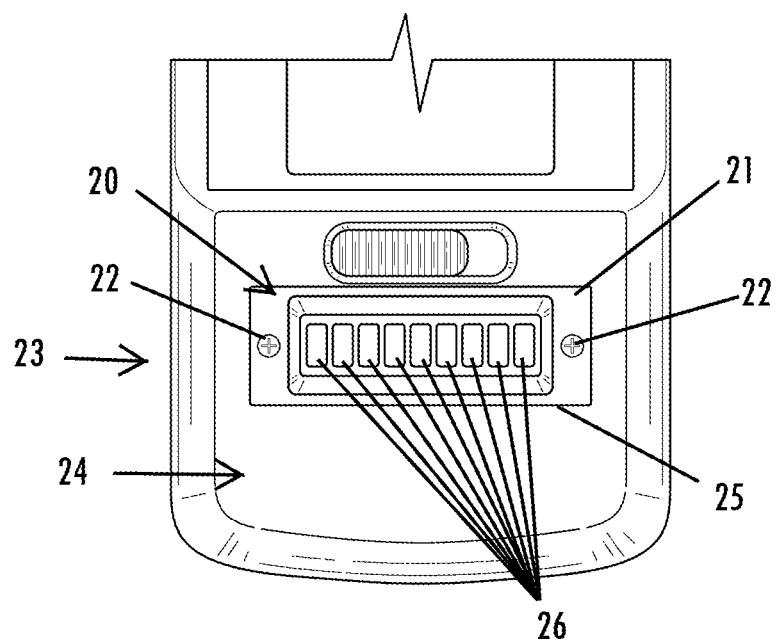
FIG. 3 depicts an exemplary connector system and exemplary connector for a mobile computer.

The present invention embraces a connector and connector system that facilitates the quick restoration of a mobile computer to working order in the field of operation. To this end, exemplary connectors typically include a releasable attachment mechanism for attaching the connector to a mobile computer.

FIG. 1 depicts a connector 10 in the bottom housing of a mobile computer. The connector 10 is located on the backhousing body 14 of the backhousing 13. As depicted, the connector 10 includes a plurality of connector pads 16. FIG. 2A depicts a close up view of the external side of the connector 10 in the backhousing body 14. FIG. 2B depicts a close up view of the internal side of the connector 10 in the backhousing body 14. As depicted, the connector 10 includes a plurality of connector pins 17. The connector 10 is typically welded to the backhousing 13 ultrasonically or with glue.

As noted, the process of docking and undocking the mobile computer deteriorates the connector's contacts (e.g., the contact pads 16 and/or the connector pins 17) over time. After many docking cycles, the wear can degrade the connection between the mobile computer and a docking station. Extreme conditions or misuse of the mobile computer can accelerate the degradation of the connector's contacts.

To replace the connector 10 of FIGS. 1, 2A, and 2B, the backhousing 13 must be removed from the mobile computer. The connector 10 is then removed from the backhousing 13, and a new connector 10 is re-welded or glued into place on the backhousing 13. Because the backhousing 13 must be removed to replace the connector 10, the connector 10 cannot be replaced in the field of use.

FIG. 3 depicts an exemplary connector system and connector 20 for a mobile computer. The connector 20 is located in an opening 25 in the backhousing body 24 of the backhousing 23. The connector 20 includes a connector body 21, two releasable attachment mechanisms 22, and a row of nine connector pads 26. The backhousing 23 includes receiving mechanisms (not shown) for receiving the connector's attachment mechanisms (e.g., screw bosses for receiving screws). The backhousing body 24 and connector body 21 are typically manufactured from the same material (e.g., plastic and/or rubber) but may be manufactured from different materials.

Figure 4:
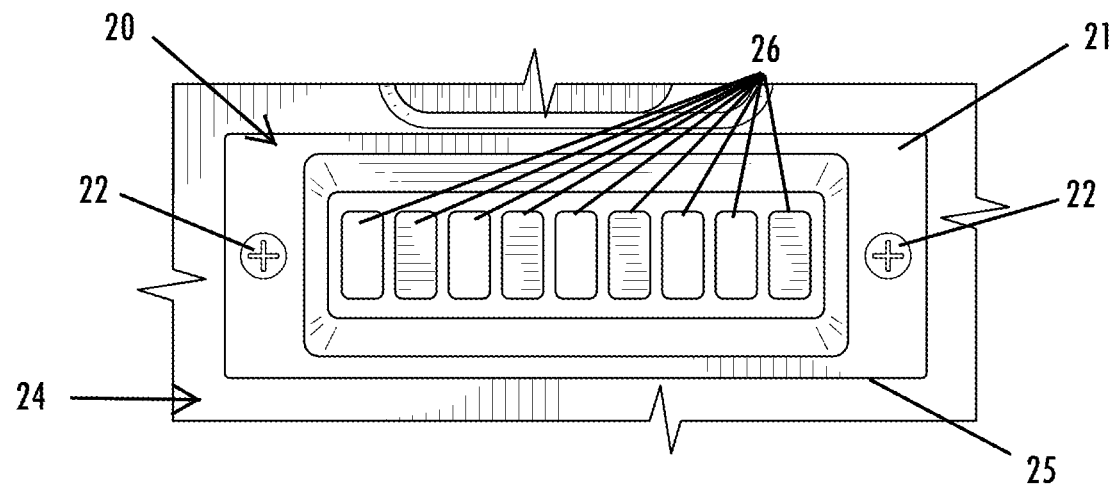
FIG. 4 depicts a close up view of the external side of an exemplary connector in the bottom housing of a mobile computer.

FIG. 4 depicts a close up view of the external side of the exemplary connector 20 in the backhousing body 24. The depicted external side of the exemplary connector 20 will typically engage a docking station (e.g., via connector pads 26).

As depicted, the exemplary connector 20 includes two releasable attachment mechanisms 22. Other exemplary connectors in accordance with the present invention may include only one releasable attachment mechanism or more than two releasable attachment mechanisms (e.g., three, four, or more).

FIGS. 3 and 4 depict screws as the releasable attachment mechanisms 22. Other exemplary connectors in accordance with the present invention may include a mechanical latch (e.g., a mechanical snap or tab) as a releasable attachment mechanism. For such exemplary connectors, the backhousing may include a latch indention for receiving the mechanical latch.

Figure 5:
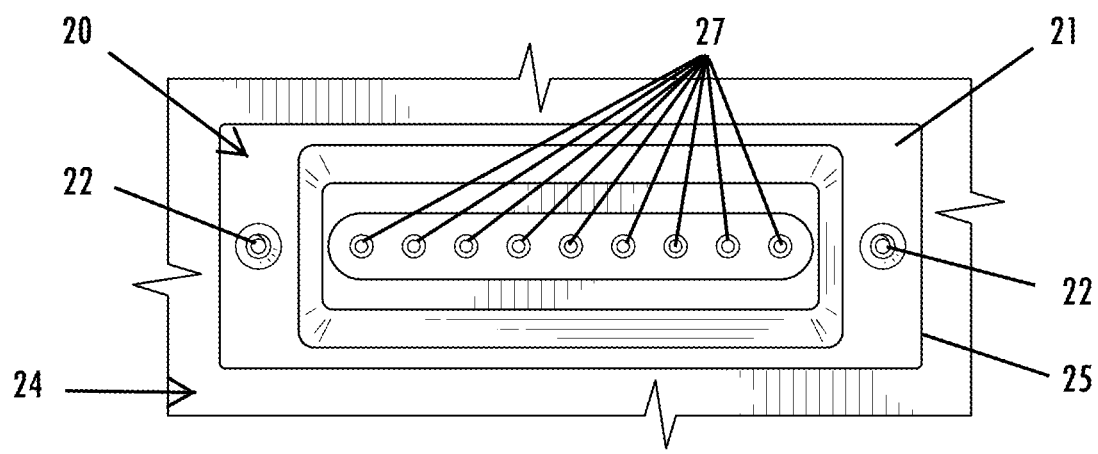
FIG. 5 depicts a close up view of the internal side of an exemplary connector in the bottom housing of a mobile computer.

FIG. 5 depicts a close up view of the internal side of the exemplary connector 20 in opening 25 of the backhousing body 24. The connector 20 includes a plurality of connector pins 27 (e.g., spring-contact type pins and/or pogo-pins). The depicted internal side of the connector 20 will typically engage the mobile computer's interior components (e.g., metal pads on a system board). Typically, each connector pin 27 is in contact with a respective connector pad 26 on the external side of the connector 20. Thus, the connector pads 26 and connector pins 27 provide an electrical connection between external accessories (e.g., a docking station) and the mobile computer's interior components. Typically, the connector pads 26 and connector pins 27 include gold-plated copper and/or hard nickel.

Figure 6:
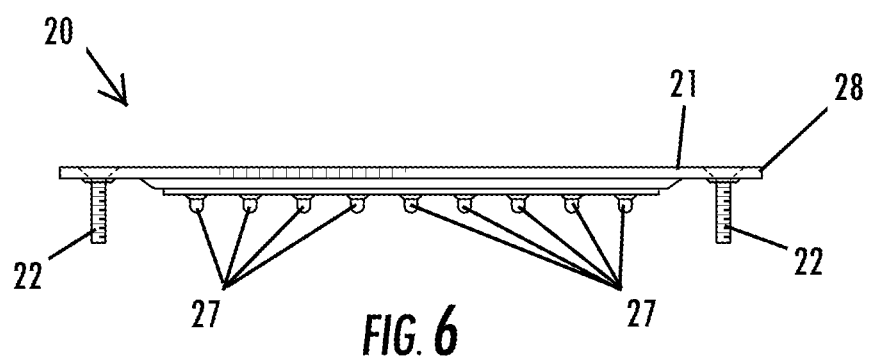
FIG. 6 depicts a side view of an exemplary connector.

FIG. 6 depicts a side view of the exemplary connector 20. The connector pins 27 extend downward from the connector body 21. Additionally, the connector 20 includes a seal 28 positioned around the outer edge of the connector body 21. The seal 28 prevents the ingress of contaminants between the connector 20 and the backhousing body 24 when the connector 20 and backhousing 23 are attached. The backhousing 23 may also include a seal positioned around the outer edge of the opening 25 to prevent the ingress of contaminants. The seal may be a rubber material.

The interface between the connector 20 and the backhousing 23 typically prevents the ingress of dust. The interface between the connector 20 and the backhousing 23 typically also prevents the ingress of water when the device is submerged for about 30 minutes. In exemplary embodiments, the interface between the connector 20 and the backhousing 23 meets an ingress protection standard of IP67 as defined in the IEC standard 60529, which is hereby incorporated by reference in its entirety.

To replace the exemplary connector 20 of FIGS. 3-6, a user disengages the releasable attachment mechanisms 22 from the backhousing body 24. Individual pieces of the exemplary connector 20 (e.g., the connector pads 26 and/or connector pins 27) may then be replaced, or a new exemplary connector 20 may be attached to the backhousing body 24. Because the backhousing 23 remains on the mobile computer, the connector 20 may be replaced relatively quickly in the field of use.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A connector for a mobile computer for facilitate use of the computer with a docking station, comprising:
    a connector body;
    two or more connector pads within the connector body, each connector pad comprising an external surface that engages electrical contacts a docking station; and
    a releasable attachment mechanism for attaching the connector to a mobile computer.

2. The connector according to claim 1, wherein the connector's releasable attachment mechanism comprises one or more screws.

3. The connector according to claim 1, wherein the connector's releasable attachment mechanism comprises a mechanical latch.

4. The connector system according to claim 1, wherein the connector comprises a seal positioned around the outer edge of the connector body.

5. The connector system according to claim 1, wherein the connector comprises two or more connector pins, each connector pin being in contact with a respective connector pad.

6. A handheld scanner comprising the connector according to claim 1, wherein each connector pad comprises an external surface that engages a docking station.

7. A computer system to facilitate use of a mobile computer with a docking station, comprising:
    a connector comprising a connector body, two or more connector pads within the connector body, each connector pad comprising an external surface that engages electrical contacts of a docking station, and an attachment mechanism; and a backhousing comprising
    a backhousing body and a receiving mechanism for receiving the connector's attachment mechanism;
    wherein the connector's attachment mechanism and the backhousing's receiving mechanism are adapted to releasably attach the connector to the backhousing.

8. The connector system according to claim 7, wherein the connector's attachment mechanism comprises one or more screws.

9. The connector system according to claim 7, wherein the connector's attachment mechanism comprises a mechanical latch.

10. The connector system according to claim 7, wherein:
    the connector's attachment mechanism comprises one or more screws; and
    the backhousing's receiving mechanism comprises screw bosses.

11. The connector system according to claim 7, wherein:
    the connector's attachment mechanism comprises a mechanical latch; and
    the backhousing's receiving mechanism comprises a latch indention.

12. The connector system according to claim 7, wherein the connector comprises a seal positioned around the outer edge of the connector body.

13. The connector system according to claim 7, wherein the backhousing comprises a seal that is positioned on the backhousing body to prevent the ingress of contaminants between the connector and backhousing when the connector and backhousing are attached.

14. The connector system according to claim 7, comprising a seal to prevent the ingress of contaminants between the connector and backhousing when the connector and backhousing are attached.

15. The connector system according to claim 7, wherein the connector comprises two or more connector pins, each connector pin being in contact with a respective connector pad.

16. The connector system according to claim 7, wherein the backhousing comprises two or more metal pads, each metal pad positioned to engage a respective connector pad.

17. The connector system according to claim 7, wherein:
    the connector comprises two or more connector pins, each connector pin being in contact with a respective connector pad; and
    the backhousing comprises two or more metal pads, each metal pad positioned to engage a respective connector pin.

18. A handheld scanner comprising the connector system according to claim 7, wherein each connector pad comprises an external surface that engages a docking station.

* * * * *